(12) United States Patent
Tokura et al.

(10) Patent No.: US 11,780,441 B2
(45) Date of Patent: Oct. 10, 2023

(54) TRAVELING CONTROL APPARATUS, TRAVELING CONTROL METHOD, AND NON-TRANSITORY STORAGE MEDIUM

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Takeshi Yasuda, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/525,618

(22) Filed: Nov. 12, 2021

(65) Prior Publication Data

US 2022/0153272 A1 May 19, 2022

(30) Foreign Application Priority Data

Nov. 17, 2020 (JP) ................................. 2020-190773

(51) Int. Cl.
*B60W 30/18* (2012.01)
*B60W 20/00* (2016.01)
*B60W 50/00* (2006.01)

(52) U.S. Cl.
CPC ...... *B60W 30/18127* (2013.01); *B60W 20/00* (2013.01); *B60W 50/00* (2013.01); *B60W 2050/0028* (2013.01); *B60W 2510/244* (2013.01); *B60W 2520/10* (2013.01); *B60W 2520/12* (2013.01); *B60W 2530/10* (2013.01); *B60W 2530/13* (2021.08); *B60W 2530/16* (2013.01); *B60W 2552/15* (2020.02); *B60W 2552/35* (2020.02); *B60W 2555/20* (2020.02); *B60W 2556/10* (2020.02)

(58) Field of Classification Search
CPC ............................................. B60W 30/18127
See application file for complete search history.

(56) References Cited

U.S. PATENT DOCUMENTS

| | | | |
|---|---|---|---|
| 9,327,712 B2 * | 5/2016 | Matthews | B60W 10/18 |
| 10,676,088 B2 * | 6/2020 | Hu | B60W 30/165 |
| 2021/0138909 A1 * | 5/2021 | Tokura | B60W 40/1005 |
| 2021/0179063 A1 * | 6/2021 | Tokura | B60W 50/0097 |

(Continued)

FOREIGN PATENT DOCUMENTS

| | | |
|---|---|---|
| JP | 4702086 B2 | 6/2011 |
| JP | 2021-075266 A | 5/2021 |

*Primary Examiner* — Michael A Berns
(74) *Attorney, Agent, or Firm* — Oliff PLC

(57) ABSTRACT

A traveling control apparatus is mounted on a vehicle that includes an electric motor and an internal combustion engine as power sources. The traveling control apparatus includes an electronic control unit configured to create a speed profile obtained by predicting speed of the vehicle at each time, derive, based on at least the speed profile, a coefficient profile that is a coefficient at each time used at the time of predicting an amount of regenerative energy recoverable by regenerative braking of the electric motor, approximate the speed profile with a predetermined approximation model and estimate a predicted amount of regenerative energy based on an approximation result and the coefficient profile, and determine the power source used for traveling based on the predicted amount of regenerative energy.

14 Claims, 15 Drawing Sheets

(56) References Cited

U.S. PATENT DOCUMENTS

| | | | |
|---|---|---|---|
| 2022/0126810 A1* | 4/2022 | Tokura | B60W 50/0097 |
| 2022/0153272 A1* | 5/2022 | Tokura | B60W 20/00 |
| 2022/0306074 A1* | 9/2022 | Kono | B60W 30/18127 |

* cited by examiner

TRAVELING CONTROL APPARATUS, TRAVELING CONTROL METHOD, AND NON-TRANSITORY STORAGE MEDIUM

CROSS-REFERENCE TO RELATED APPLICATION

This application claims priority to Japanese Patent Application No. 2020-190773 filed on Nov. 17, 2020, incorporated herein by reference in its entirety.

BACKGROUND

1. Technical Field

The present disclosure relates to a traveling control apparatus mounted on a vehicle, a traveling control method, and a non-transitory storage medium.

2. Description of Related Art

In a hybrid vehicle including an electric motor and an internal combustion engine, it is possible to improve fuel efficiency by an efficient traveling control using the electric motor and the internal combustion engine.

Japanese Patent No. 4702086 (JP 4702086 B) discloses a vehicle driving assistance apparatus that guides, based on a vehicle position and map information of a point at which the vehicle needs to stop or decelerate, such as a railroad crossing or a curve, a user to a braking start point at which a regenerative braking operation needs to be started. In this driving assistance apparatus for a vehicle, it is possible to increase a recovery amount of regenerative energy by prompting the user to operate a regenerative brake at a deceleration rate at which regenerative energy can be efficiently recovered.

SUMMARY

With the technology disclosed in JP 4702086 B, it is possible to predict a point at which the recovery of regenerative energy is expected, but it is impossible to quantitatively predict the recovery amount of regenerative energy. With any technology, when it is possible to quantitatively predict the recovery amount of regenerative energy at an early stage, it can be used for appropriate driving control.

The present disclosure provides a traveling control apparatus, a traveling control method, and a non-transitory storage medium used for traveling control by quantitatively predicting a recovery amount of regenerative energy.

A first aspect of the present disclosure is a traveling control apparatus configured to be mounted on a vehicle that includes an electric motor and an internal combustion engine as power sources. The traveling control apparatus includes an electronic control unit configured to create a speed profile obtained by predicting speed of the vehicle at each time, derive, based on at least the speed profile, a coefficient profile that is a coefficient at each time used at the time of predicting an amount of regenerative energy recoverable by regenerative braking of the electric motor, approximate the speed profile with a predetermined approximation model and estimate a predicted amount of regenerative energy based on an approximation result and the coefficient profile, and determine the power source used for traveling based on the predicted amount of regenerative energy.

In the first aspect, the electronic control unit may derive the coefficient profile based on the speed profile and a fuel consumption characteristic of the internal combustion engine.

In the first aspect, the electronic control unit may create the speed profile based on one or both of a traveling history of a user and a traveling history of a person other than the user.

In the first aspect, as the predetermined approximation model, a model that approximates changes in the speed of the vehicle over time by a sum of Gaussian functions having different peak positions, may be used. The changes in the speed of the vehicle over time are represented by the speed profile.

In the first aspect, the number of the Gaussian functions that approximate the speed profile may be set as the number of poles at which an average speed for each of a plurality of sections obtained by dividing the speed profile at equal intervals changes from an increase to a decrease.

In the first aspect, the electronic control unit may calculate a parameter of the Gaussian functions using at least any two of speed, mileage, and a required traveling time of the vehicle.

In the first aspect, the electronic control unit may derive, based on the approximation result and the coefficient profile, power represented by a sum of power that contributes to a change in kinetic energy of the vehicle and power that is dissipated by traveling resistance, set one or more periods in which the power is negative as a period in which regenerative energy is recoverable, and set a time-integral value of a magnitude of the power in the period as an estimated value of the predicted amount of regenerative energy in the period.

In the first aspect, the electronic control unit may estimate the predicted amount of regenerative energy further based on one or more fluctuation factors.

In the first aspect, the fluctuation factor may be at least one of a kind of road surface, a slope of the road surface, a load weight of the vehicle, and weather.

In the first aspect, the electronic control unit may correct power based on the fluctuation factor.

In the first aspect, the electronic control unit may correct the time-integral value based on the fluctuation factor.

In the first aspect, the electronic control unit may determine to travel using the electric motor when a condition including a situation where a sum of energy for the electric motor currently stored in the vehicle and the predicted amount of regenerative energy in a next period is equal to or higher than a threshold value is satisfied.

A second aspect of the present disclosure is a traveling control method executed by an electronic control unit mounted on a vehicle that includes an electric motor and an internal combustion engine as power sources. The traveling control method includes a step of creating, by the electronic control unit, a speed profile obtained by predicting speed of the vehicle at each time, a step of deriving, by the electronic control unit, based on at least the speed profile, a coefficient profile that is a coefficient at each time used at the time of predicting an amount of regenerative energy recoverable by regenerative braking of the electric motor, a step of approximating, by the electronic control unit, the speed profile with a predetermined approximation model and estimating a predicted amount of regenerative energy based on an approximation result and the coefficient profile, and a step of determining, by the electronic control unit, the power source used for traveling based on the predicted amount of regenerative energy.

A third aspect of the present disclosure is a non-transitory storage medium storing a command, which is executable on an electronic control unit of a traveling control apparatus mounted on a vehicle that includes an electric motor and an internal combustion engine as power sources, and causes the electronic control unit to execute functions. The functions include creating a speed profile obtained by predicting speed of the vehicle at each time, deriving, based on at least the speed profile, a coefficient profile that is a coefficient at each time used at the time of predicting an amount of regenerative energy recoverable by regenerative braking of the electric motor, approximating the speed profile with a predetermined approximation model and estimating a predicted amount of regenerative energy based on an approximation result and the coefficient profile, and determining the power source used for traveling based on the predicted amount of regenerative energy.

With the foregoing aspects of the present disclosure, since a speed profile obtained by predicting speed of a vehicle and a coefficient profile used at a time of predicting an amount of regenerative energy are created, it is possible to quantitatively predict a recovery amount of regenerative energy based on the speed profile and the coefficient profile and use the predicted recovery amount for driving control.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. A traveling control apparatus according to the present embodiment executes an appropriate traveling control to improve fuel efficiency by quantitatively predicting a recovery amount of regenerative energy at an early stage, using a speed profile obtained by predicting speed of a vehicle and a coefficient profile used at the time of predicting an amount of regenerative energy.

Embodiments

Configuration

Figure 1:
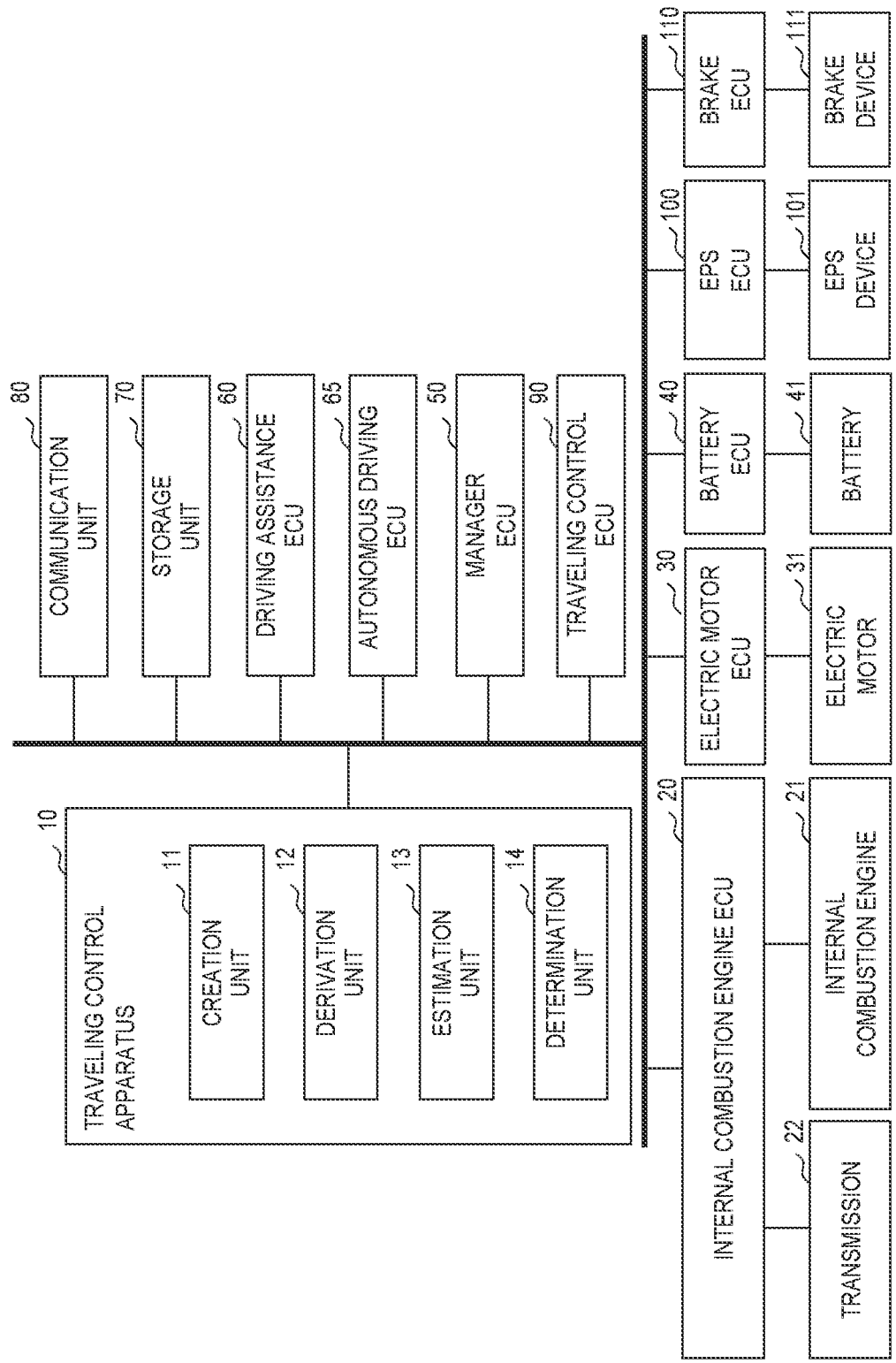
FIG. 1 is a diagram illustrating functional blocks of a traveling control apparatus according to an embodiment of the present disclosure and peripheral units thereof.

FIG. 1 is a diagram illustrating functional blocks of a traveling control apparatus 10 according to an embodiment of the present disclosure and peripheral units thereof. A traveling control apparatus 10 is mounted on the vehicle. In addition to the traveling control apparatus 10, the vehicle includes an internal combustion engine ECU 20, an internal combustion engine 21, a transmission 22, an electric motor ECU 30, an electric motor 31, a battery ECU 40, a battery 41, a manager ECU 50, a driving assistance ECU 60, an autonomous driving ECU 65, a storage unit 70, a communication unit 80, a traveling control ECU 90, an electric power steering (EPS) ECU 100, an EPS device 101, a brake ECU 110, and a brake device 111.

In addition to the above configurations, the vehicle also may include various sensors, such as an accelerator pedal sensor, a brake pedal sensor, a camera or an obstacle sensor, a vehicle speed sensor, a yaw rate sensor, and a GPS sensor, and various devices, such as a navigation system (none of them shown).

The internal combustion engine 21 and the electric motor 31 are actuators that serve as power sources that drive the vehicle. The electric motor 31 is also a generator that generates power and a braking device that generates a braking force by regenerative braking.

The internal combustion engine ECU 20 is an electronic control unit (ECU) that executes a control for generating a driving torque by controlling the internal combustion engine 21 and the transmission 22 that changes rotation speed between an input and an output, or for generating a braking torque by an engine brake.

The electric motor ECU 30 is an ECU that executes a control for generating a driving torque by controlling the electric motor 31, or for generating a braking torque by a regenerative brake.

The battery 41 supplies power to the electric motor 31 or other devices by discharging, or charges the power (recovered energy) obtained by the regenerative braking of the electric motor 31. The battery ECU 40 is an ECU that controls the charging and discharging of power of the battery 41.

The traveling control ECU 90 is an ECU that controls the internal combustion engine ECU 20 and the electric motor ECU 30 according to a traveling mode to be described below.

The EPS device 101 is an actuator that executes steering by changing the steering angles of the wheels so as to change the proceeding direction of the vehicle. The EPS ECU 100 is an ECU that controls the EPS device 101.

The brake device 111 (a foot brake device) is an actuator that generates a braking force by a frictional force against a member that rotates with the wheels. The brake ECU 110 is an ECU that controls the brake device 111.

The driving assistance ECU 60 is an ECU that executes a function of driving assistance, such as avoiding a collision, following a preceding vehicle, and staying in a lane. The driving assistance ECU 60 outputs an instruction for controlling a motion of the vehicle, such as acceleration/deceleration or a steering angle, based on information acquired from various sensors and the like. The function or the number of the driving assistance ECUs 60 is not limited.

The autonomous driving ECU 65 is an ECU that executes a function of autonomous driving. The autonomous driving ECU 65 outputs an instruction for controlling the motion of the vehicle, such as acceleration/deceleration or a steering angle, in order to execute the function of autonomous driving based on the information acquired from various sensors and the like.

The manager ECU 50 gives an instruction to the traveling control ECU 90, the EPS ECU 100, the brake ECU 110, or the like (hereinafter collectively referred to as an actuator ECU), based on instructions from the driving assistance ECU 60, the autonomous driving ECU 65, or the like. For example, the manager ECU 50 gives an acceleration instruction to the traveling control ECU 90, a steering instruction to the EPS ECU 100, and a deceleration instruction to the traveling control ECU 90 and the brake ECU 110.

Upon receiving instructions from a plurality of driving assistance ECUs 60 and the like, the manager ECU 50 executes a process, referred to as arbitration, for determining, based on a predetermined rule, which instruction to follow to control the vehicle, and gives the instruction to the actuator ECU based on the arbitration result. The manager ECU 50 may acquire content of a user's operation on a steering wheel, a brake pedal, an accelerator pedal, and the like, and make the operation content a target of the arbitration process, or the actuator ECU may acquire the content of the user's operation and individually arbitrate the user's manual operation and the instruction from the manager ECU 50.

The storage unit 70 stores one or more traveling histories of the user. The traveling history is information including the speed of the vehicle at each time point within a driving period when the user has driven the vehicle in the past. The storage unit 70 generates a traveling history by periodically storing the speed of the vehicle acquired from the vehicle speed sensor and the like included in the vehicle while, for example, the vehicle is in a power-on state. The storage unit 70 may be provided as, for example, a part of a car navigation system.

The communication unit 80 can wirelessly communicate with a server outside the vehicle, another vehicle, or the like, and can receive a traveling history of a person other than the user, which is obtained based on a traveling result of another vehicle.

The traveling control apparatus 10 is an ECU including a creation unit 11, a derivation unit 12, an estimation unit 13, and a determination unit 14. The creation unit 11 creates a speed profile based on the traveling history. Based on at least the speed profile created by the creation unit 11, the derivation unit 12 derives a coefficient profile, which is a coefficient at each time used at the time of predicting an amount of regenerative energy, which is energy recoverable by the regenerative braking. Based on the speed profile created by the creation unit 11 and the coefficient profile derived by the derivation unit 12, the estimation unit 13 estimates a predicted amount of regenerative energy, which is energy recoverable by regenerative braking. Based on the predicted amount of regenerative energy estimated by the estimation unit 13, the determination unit 14 determines which of the electric motor 31 and the internal combustion engine 21 is to be used for traveling.

Each of the above ECUs is typically a computer including a memory and a processor. The processor of each ECU reads and executes a program stored in, for example, a non-transitory memory, and implements a function of the ECU. These ECUs are connected to each other by a communication line, and can operate cooperatively by properly communicating with each other.

The above-described configurations of the devices and the traveling control apparatus 10 mounted on the vehicle are examples, and can be properly added to, replaced, changed, or omitted. Further, the function of each device can be properly integrated into one device or distributed to a plurality of devices for implementation.

For example, the traveling control apparatus 10 may be provided as an independent ECU, but may be provided as a part of the manager ECU 50, the traveling control ECU 90, or the like. The function of the traveling control apparatus 10 may be distributed and provided to the manager ECU 50, the traveling control ECU 90, or the like.

Further, for example, the traveling control apparatus 10, the driving assistance ECU 60, the autonomous driving ECU 65, the manager ECU 50, the traveling control ECU 90, and the like may be provided as one ECU. Further, for example, the autonomous driving ECU 65 does not have to be provided.

Processing

Figure 2:
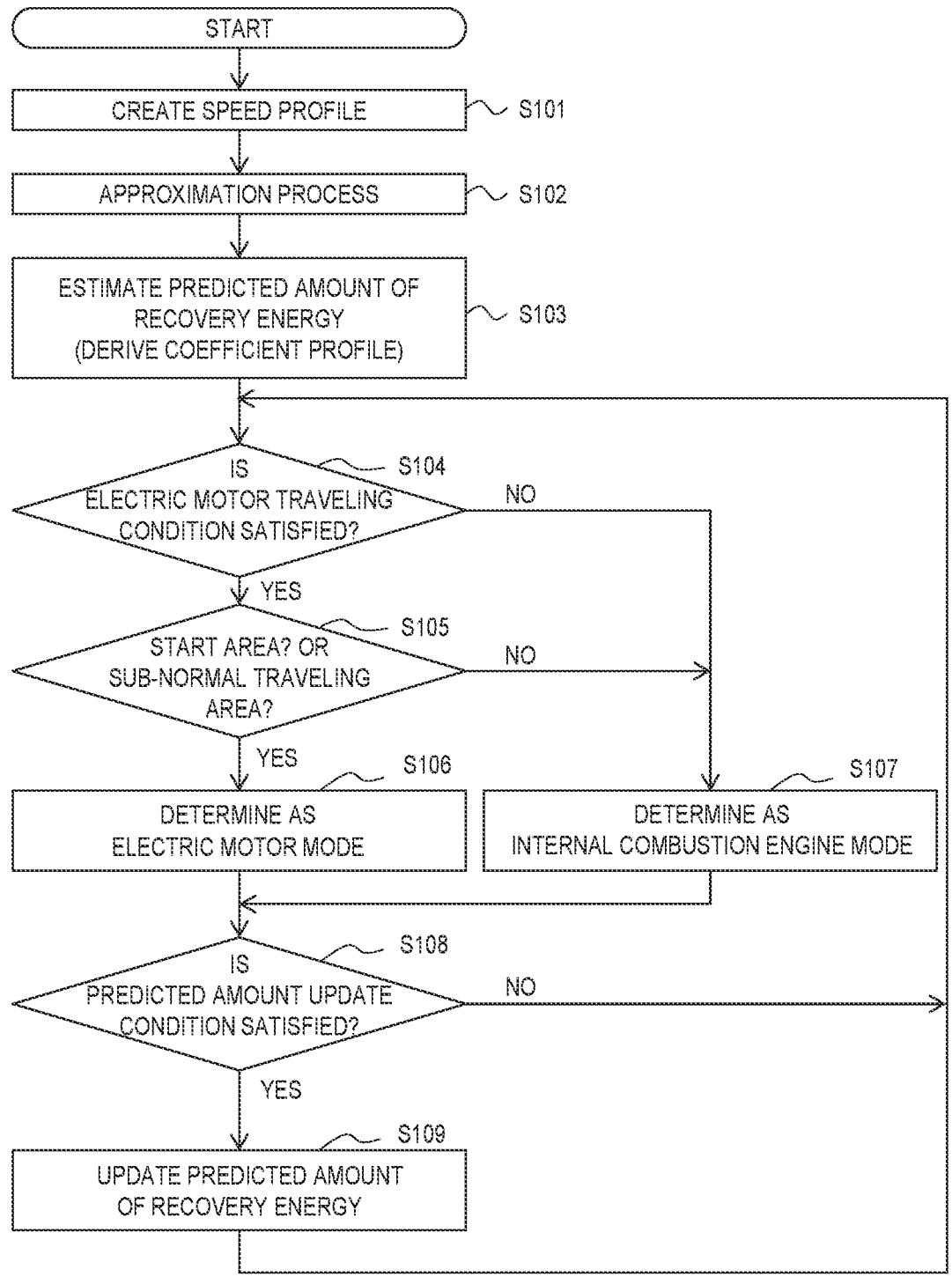
FIG. 2 is a diagram illustrating a flowchart of traveling control processing according to an embodiment of the present disclosure.

Hereinbelow, an example of processing executed by the traveling control apparatus 10 according to the present embodiment will be described in detail. FIG. 2 is a flowchart of traveling control processing executed by the traveling control apparatus 10. This traveling control processing is started when, for example, the user turns the vehicle to the power-on state to start a trip, and is executed until the user turns the vehicle to a power-off state to end the trip.

(Step S101)

The creation unit 11 creates a speed profile. The speed profile is information representing the speed of the vehicle predicted at each time point (each time) in this trip.

Figure 3:
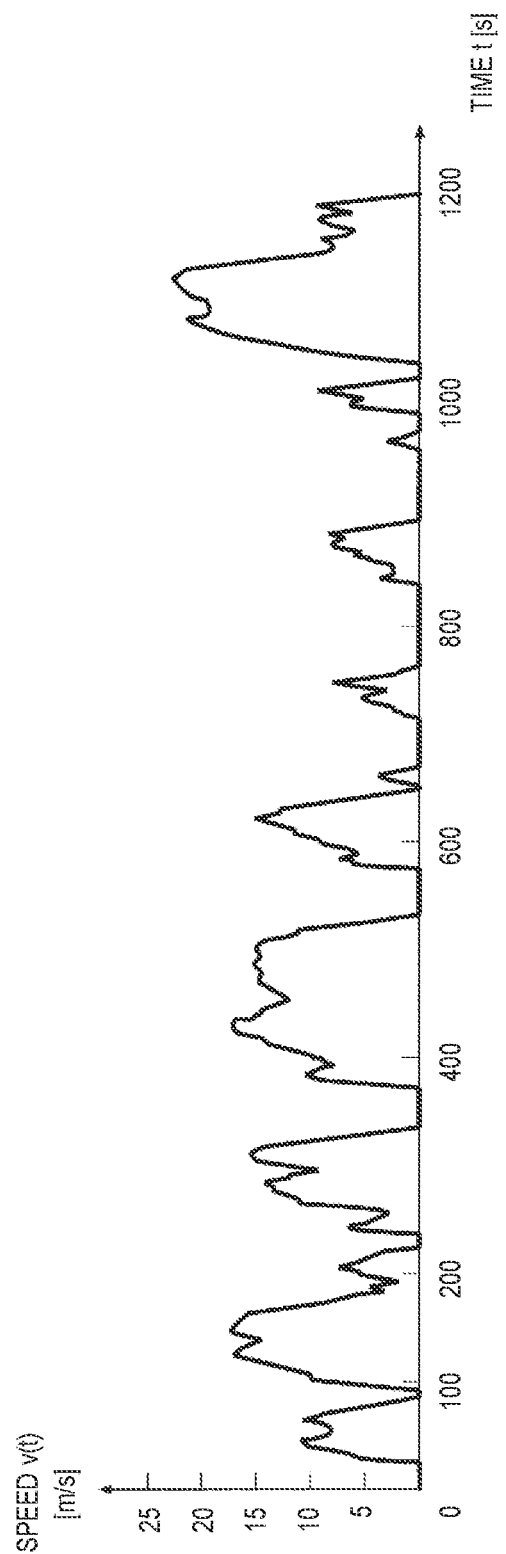
FIG. 3 is diagram illustrating an example of a speed profile according to an embodiment of the present disclosure.

FIG. 3 illustrates an example of the speed profile. FIG. 3 illustrates the speed profile in which the horizontal axis represents an elapsed time t[s] from the start of the trip and the vertical axis represents the vehicle speed v(t) [m/s]. The speed profile is based on, for example, a speed change pattern used in a fuel consumption rate test (a JC08 mode) determined in Japan. The graph of the speed profile generally includes a plurality of peaks, which indicates that acceleration and deceleration are repeated during one trip.

The creation unit 11 can create a speed profile based on, for example, past traveling histories stored in the storage unit 70. As a simple example, when the user's traveling pattern is only a pattern of traveling on the same route at the same time range on weekdays for commuting, it is considered that patterns of changes in the speed over time included in the traveling histories are substantially the same. In such a case, the creation unit 11 creates the speed profile based on any one of the past traveling histories stored in the storage unit 70.

Alternatively, the storage unit 70 may classify and store the traveling histories in association with attributes, such as the day of the week and the time range in which the vehicle has traveled, and the creation unit 11 may create the speed profile based on a traveling history having a high degree of matching with this trip in terms of the attributes, such as the day of the week and the time range, from among the plurality of traveling histories stored in the storage unit 70. As such, even in a case where the user has more than one traveling patterns, when the traveling patterns have a commonality for each attribute, it is possible to specify the traveling pattern with certain accuracy and create the speed profile with high accuracy.

Alternatively, the storage unit 70 may acquire a traveling route from a navigation system and the like included in the vehicle, include the traveling route in the traveling history, and store it, and the creation unit 11 may create the speed profile based on a traveling history having a high degree of similarity to the traveling route of this trip from among a plurality of traveling histories stored in the storage unit 70. This method can be executed when, for example, the user sets the traveling route of this trip in the navigation system and the like, and the creation unit 11 can acquire the set traveling route, but can improve the accuracy of the speed profile.

Further, when the traveling route of this trip is set, the creation unit 11 may inquire of a server regarding road traffic information, such as a speed limit or congestion prediction, along the traveling route via the communication unit 80 and create the speed profile based on the information, or may request, via the communication unit 80, a server capable of creating a speed profile based on road traffic information along a traveling route to create the speed profile, and acquire the created speed profile.

The creation unit 11 may acquire a traveling history of a person other than the user via the communication unit 80 and create the speed profile based on the acquired traveling history. The server collects the traveling histories from among a large number of vehicles, and classifies and stores the traveling histories associated with, for example, the day of the week, the time range, the traveling route, and the like, and the creation unit 11 inquires of the server, acquires the traveling history having a high degree of matching with this trip in terms of classification, and uses it as a speed profile based on the acquired traveling history.

Alternatively, the server may divide a plurality of people into groups and store traveling histories of the people for each group, and the creation unit 11 may create the speed profile based on the traveling history selected from a group that includes the user from among the plurality of traveling histories stored in the server. For example, when people having their homes and workplaces in the same areas respectively are included in the same group, it is possible to improve the accuracy of the speed profile when traveling for commuting.

Alternatively, the creation unit 11 may acquire, from one or more other vehicles instead of the server, traveling histories stored in the vehicles via the communication unit 80, and create the speed profile based on the acquired traveling histories in the same manner as described above.

In each of the above-described methods, when there is a plurality of traveling histories that are candidates for the speed profile, the creation unit 11 may, for example, set any one of them or the average of them as the speed profile. The method for creating the speed profile is not limited, and the above-described methods may be properly combined. Further, the creation unit 11 may create the speed profile using only any one of the traveling history of the user and the traveling history of the person other than the user, or using both of them.

(Step S102)

Figure 4:
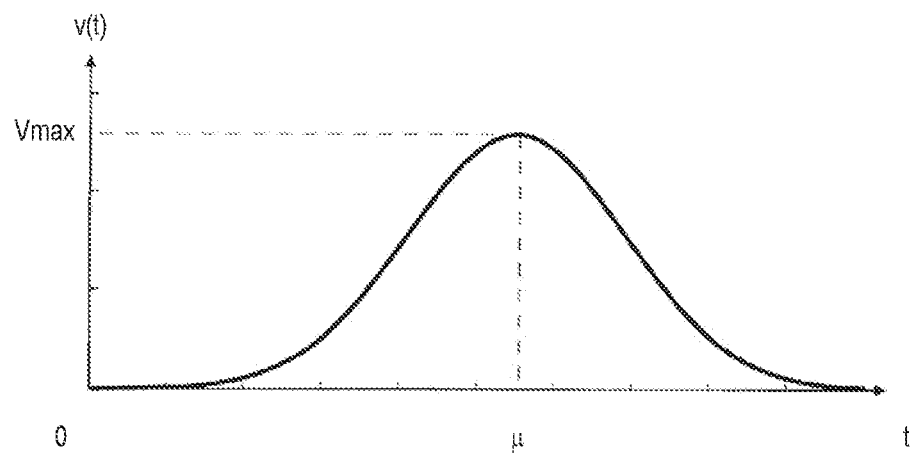
FIG. 4 is a diagram illustrating a graph of a Gaussian function.

The estimation unit 13 approximates the speed profile with a predetermined approximation model (an approximation process). In the present embodiment, a sum of Gaussian functions is used for approximation. FIG. 4 illustrates a graph (t≥0) of a Gaussian function having time t as a variable, as expressed by the following equation 1. In the equation 1, $\mu$, $v_{max}$, and $\sigma$ are parameters that define a peak position (time), a peak value, and spread of distribution, respectively.

$$v(t) = v_{max} \cdot \exp\left(\frac{-(t-\mu)^2}{2\sigma^2}\right) \quad \text{(eq. 1)}$$

Figure 5:
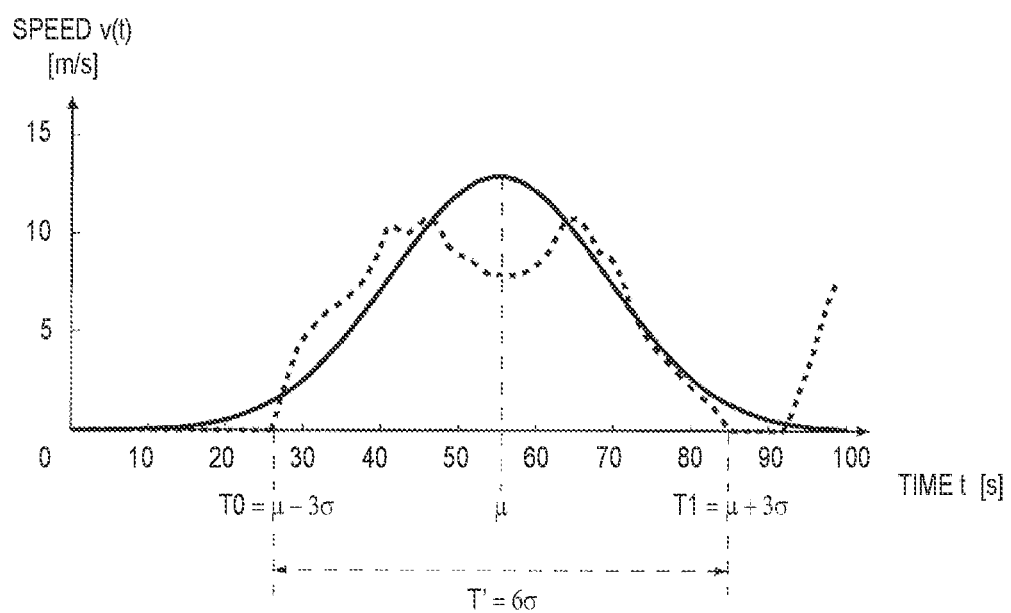
FIG. 5 is a diagram illustrating a part of the example of the speed profile according to an embodiment of the present disclosure and a graph in which the part is approximated by the Gaussian function.

In the equation 1, respective parameters $\mu$, $v_{max}$, $\sigma$ are appropriately determined. FIG. 5 illustrates a graph in which speed changes in a part (during time 0≤t≤100 (seconds)) of the speed profile illustrated in FIG. 3 is approximated. In FIG. 5, the speed profile is represented by a dotted line, and the approximation graph is represented by a solid line.

The method of calculating the respective parameters $\mu$, $v_{max}$, $\sigma$ from the speed profile is not limited. However, when the least squares method and the like are used, a calculation amount is increased. Here, an example of an appropriate calculation method capable of reducing the calculation amount will be described. As illustrated in FIG. 5, when a start time at which the speed indicated by the speed profile is greater than zero is set as T0 and a stop time at which the speed returns to zero is set as T1, in this method, the speed profile of a section from time T0 to time T1 is approximated by the Gaussian function by which this section has a range of $\mu \pm 3\sigma$. In other words, in this method, when the length of a period of this section is set as T', the parameter a can be calculated according to the following equation 2:

$$\sigma = \frac{T1-T0}{6} = \frac{T'}{6} \quad \text{(eq. 2)}$$

Further, with respect to the average speed $v_{av}$ in this section, the following equation 3 is established based on this approximation:

$$v_{av} = \frac{1}{T'}\int_{T0}^{T1} v(t)dt \approx \frac{6}{\sqrt{2\pi} \cdot 0.9973} \cdot v_{max} \quad \text{(eq. 3)}$$

Therefore, the parameter $v_{max}$ can be calculated according to the following equation 4. In the equation 4, D is mileage in this section.

$$v_{max} = \frac{\sqrt{2\pi} \cdot 0.9973}{6} \cdot v_{av} = \frac{\sqrt{2\pi} \cdot 0.9973}{6} \cdot \frac{D}{T'} \quad \text{(eq. 4)}$$

Further, the parameter $\mu$ can be calculated according to the following equation 5:

$$\mu = T0 + \frac{T'}{2} = T0 + \frac{D}{2 \cdot v_{av}} \quad \text{(eq. 5)}$$

As such, when speed of one section in which the speed of the speed profile is positive is approximated by the Gaussian function, the respective parameters $\mu$, $v_{max}$, $\sigma$ can be calculated using the traveling start time, the average speed $v_{av}$ of the vehicle, the mileage D, or the required traveling time T' in that section. The parameters may be calculated using the average speed $v_{av}$ and the required traveling time T' based on actual values, using the mileage D and the required traveling time T' based on actual values, or using the mileage D and the average speed $v_{av}$ based on actual values. With this calculation method, it is possible to calculate the parameters of the Gaussian function with a small calculation amount using a simple calculation, thereby reducing a processing load.

In the present embodiment, the entire speed profile is approximated by a sum of Gaussian functions having different peak positions $\mu_i$, corresponding to the above-described sections, respectively. Each Gaussian function may have a different peak value $v_{maxi}$ and a different spread of distribution $\sigma_i$. When the number of used Gaussian functions is set as N, the approximation expression can be expressed using $\mu_i$, $v_{maxi}$, and $\sigma_i$ (i=1, 2, ..., N) as parameters by the following equation 6:

$$v(t) = \sum_{i=1}^{N} v_{maxi} \cdot \exp\left(\frac{-(t - \mu_i)^2}{2\sigma_i^2}\right) \quad \text{(eq. 6)}$$

Here, the respective parameters $\mu_i$, $v_{maxi}$, $\sigma_i$ (i=1, 2, ..., N) can be calculated using the above-described calculation method. Alternatively, these parameters can be derived using other well-known fitting methods. For example, it is possible to determine the parameters such that an integral value S obtained by integrating the absolute value of a difference between the speed value v(t) of the speed profile and the approximation value v(t) over the entire period (0≤t≤T) of the speed profile is minimized. The integral value S is represented by the following equation 7:

$$S = \int_0^T |V(t) - v(t)| dt \quad \text{(eq. 7)}$$

Figure 6:
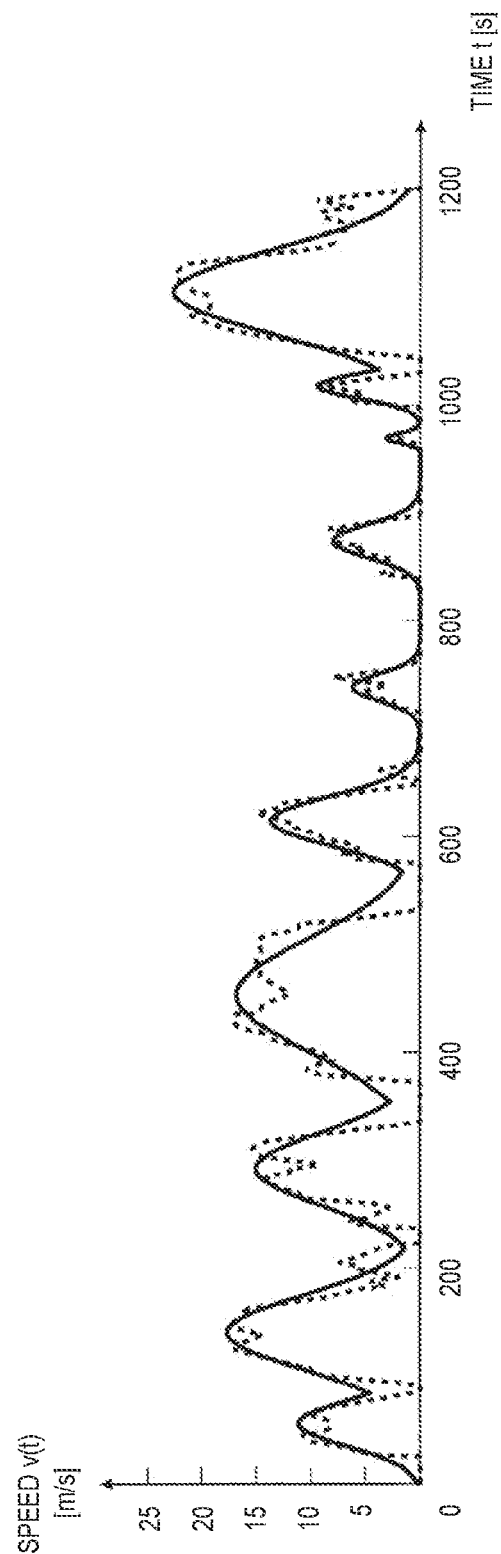
FIG. 6 is a diagram illustrating the example of the speed profile according to an embodiment of the present disclosure and a graph in which the example is approximated by the Gaussian function.

The respective parameters $\mu_i$, $v_{maxi}$, $\sigma_i$ (i=1, 2, ..., N) of the equation 6 are derived using the above method. FIG. 6 illustrates a graph in which the speed changes over the entire period of the speed profile illustrated in FIG. 3 are approximated. In FIG. 6, the speed profile is represented by a dotted line, and the approximation graph is represented by a solid line. In this example, N=10. As illustrated in FIG. 6, it can be seen that it is possible to obtain a fine approximation that characterizes the speed changes in one trip.

Figure 7:
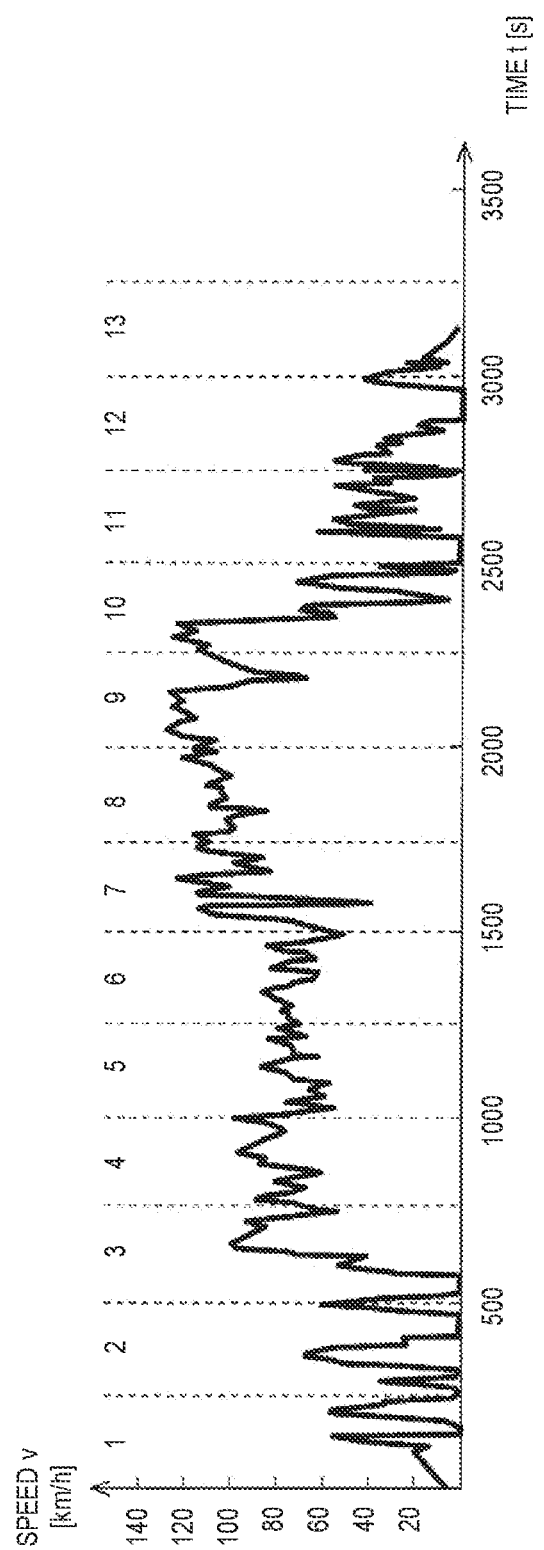
FIG. 7 is another diagram illustrating the example of the speed profile according to an embodiment of the present disclosure.
Figure 8:
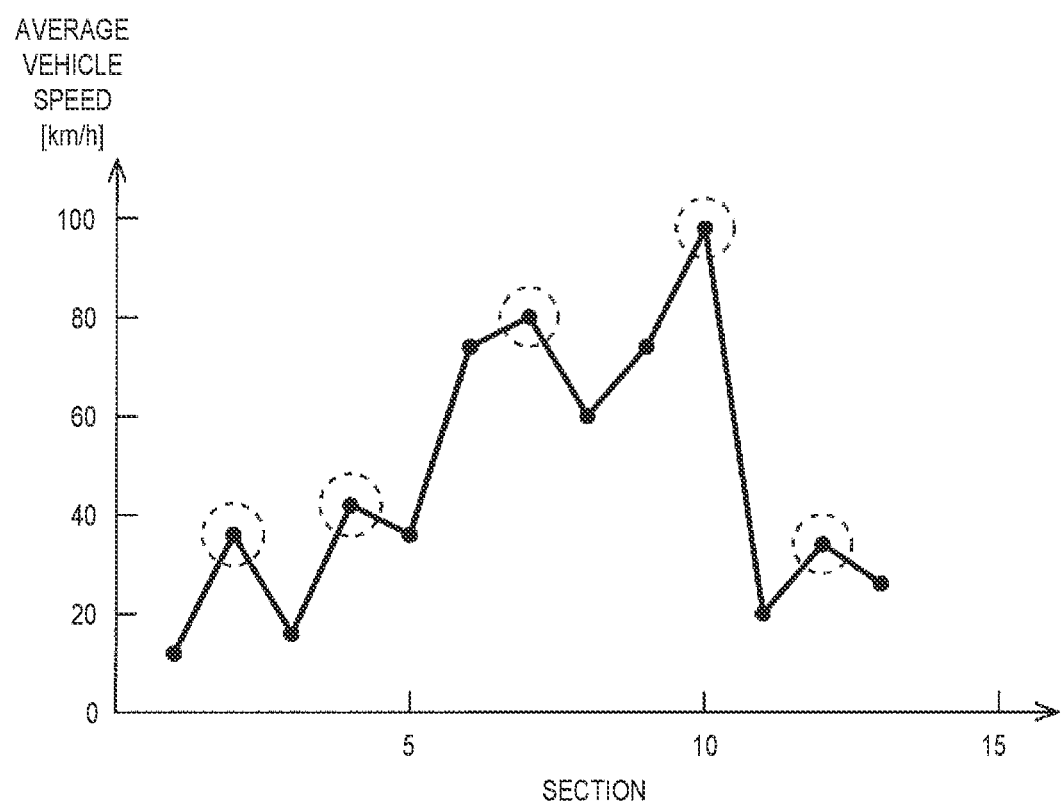
FIG. 8 is a diagram illustrating a graph of the average vehicle speed obtained for each section of FIG. 7 according to an embodiment of the present disclosure.

The value of N, which is the number of Gaussian functions used for approximation, is not particularly limited, but an example of a method of appropriately determining the value of N based on characteristics (such as a trip period and the number of peaks) of the applied speed profile will be described with further reference to FIGS. 7 to 9. FIG. 7 illustrates an example of the speed profile of a trip of departing from a city area, traveling at high speed on the way, and arriving at another city area.

First, the estimation unit 13 divides the speed profile of a target trip into a plurality of sections at equal intervals. The number of sections and the length of time are not particularly limited, but can be determined based on a period in which a certain traveling state (city area traveling, high-speed traveling) in the target trip is continued, or the like. In the example illustrated in FIG. 7, a trip during approximately 1 hour is divided into 13 sections at intervals of 250 seconds.

Next, the estimation unit 13 obtains the average vehicle speed for each of the plurality of sections. FIG. 8 illustrates a graph of the average vehicle speed obtained in each section. Then, the estimation unit 13 obtains the number of vertices in the graph of the average vehicle speed. Here, the vertex is a pole at which the average speed changes from an increase to a decrease. In the example of FIG. 8, there are five vertices in the second, fourth, seventh, tenth, and twelfth sections.

As a result, the number of vertices is the optimum number of Gaussian functions used to approximate this speed profile (N=5). The speed profile is approximated using the parameters $\mu$, $v_{max}$, $\sigma$ that are properly calculated based on the above-described method for these five vertices. As illustrated in FIG. 9, using this process, it is possible to obtain an efficient and accurate approximation graph (a solid line) with respect to the speed profile (a dotted line).

When the trip period is relatively short or the number of peaks is relatively small, the number of Gaussian functions used for approximation may be set as one (N=1).

(Step S103)

Using the approximation model, the estimation unit 13 estimates the predicted amount of regenerative energy, which is energy obtained by the regenerative braking of the electric motor 31. The estimation method will be described below.

First, the estimation unit 13 derives a required amount of power P(t), which is power to be given to the vehicle in order to maintain the speed v(t). P(t) is expressed by the following equation 8:

$$P(t) = m \cdot \frac{dv(t)}{dt} \cdot v(t) + \{a \cdot (v(t))^2 + b \cdot v(t) + c\} \cdot v(t) \quad \text{(eq. 8)}$$

Here, m is the weight of the vehicle. m·dv(t)/dt represents a rate of changes in a motion amount of the vehicle, and $a \cdot (v(t))^2 + b \cdot v(t) + c$ represents traveling resistance. The required amount of power P(t) is a sum obtained by multiplying the above two items by the vehicle speed v(t), respectively. In other words, the required amount of power P(t) is the sum of power that contributes to changes in kinetic energy of the vehicle and power that is dissipated by the traveling resistance, and is power required to implement the speed v(t) at time t. As illustrated in the equation 8, it is possible to appropriately approximate the traveling resistance by expressing it by a sum of a component $(a \cdot (v(t))^2)$ proportional to the square of the speed, a component (b·v(t)) proportional to the first power thereof, and a constant component (c).

Figure 10:
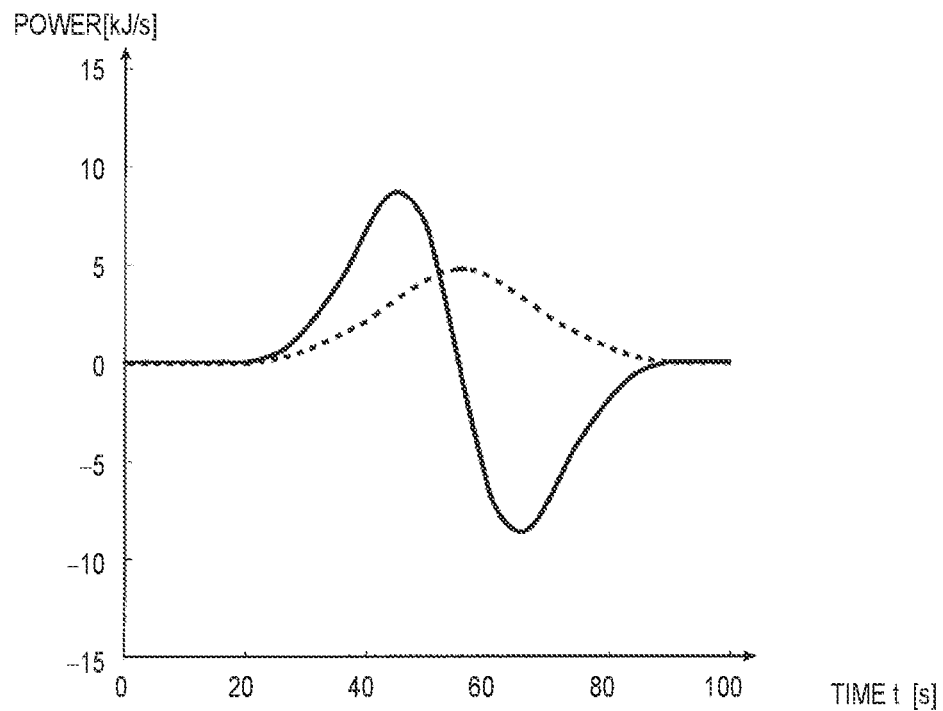
FIG. 10 is a diagram illustrating a graph of an example of an amount linked to changes in kinetic energy and an amount dissipated by traveling resistance from among required amounts of powers according to an embodiment of the present disclosure.

In FIG. 10, the horizontal axis represents time t[s], the vertical axis represents power [kJ/s], and an example of the amount contributing to the changes in kinetic energy (the first term on the right side of the equation 8) is represented by a solid line, and an example of the amount dissipated by the traveling resistance (the second term on the right side of the equation 8) is represented by a dotted line in the required amount of power P(t) in the part (during time 0≤t≤100 (seconds)) of the speed profile illustrated in FIG. 3.

Figure 11:
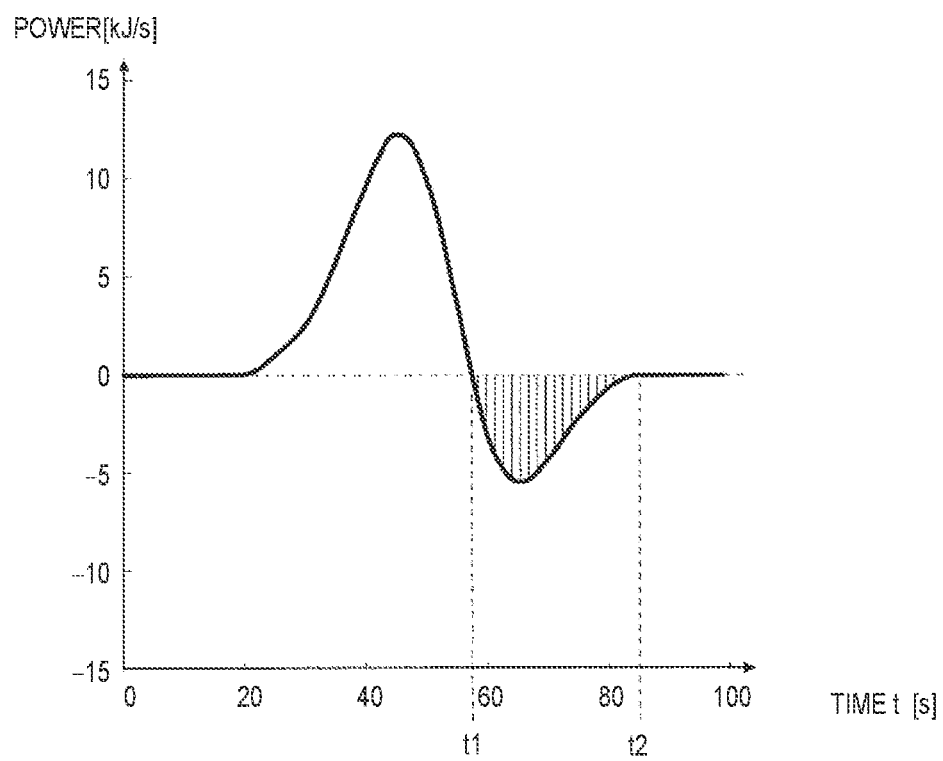
FIG. 11 is a diagram illustrating a graph of an example of the required amount of power according to an embodiment of the present disclosure.

Further, FIG. 11 illustrates a graph of a total amount of the required amount of power P(t). In the graph, the horizontal axis represents time t[s] and the vertical axis represents power [kJ/s].

Next, based on the required amount of power P(t), the estimation unit 13 estimates a period in which regenerative energy is predicted to be recoverable and a predicted recovery amount. In the graph illustrated in FIG. 11, a period (t1<t<t2) in which the value of the required amount of power P(t) is negative is the period in which regenerative energy is predicted to be recoverable. Further, as expressed by the following equation 9, an integral value of the magnitude of the required amount of power in this period, that is, an area of a region represented by hatching in FIG. 11, is an estimated value E of the predicted amount of regenerative energy to be recovered.

$$E=\int_{t1}^{t2}|P(t)|dt \quad \text{(eq. 9)}$$

Figure 12:
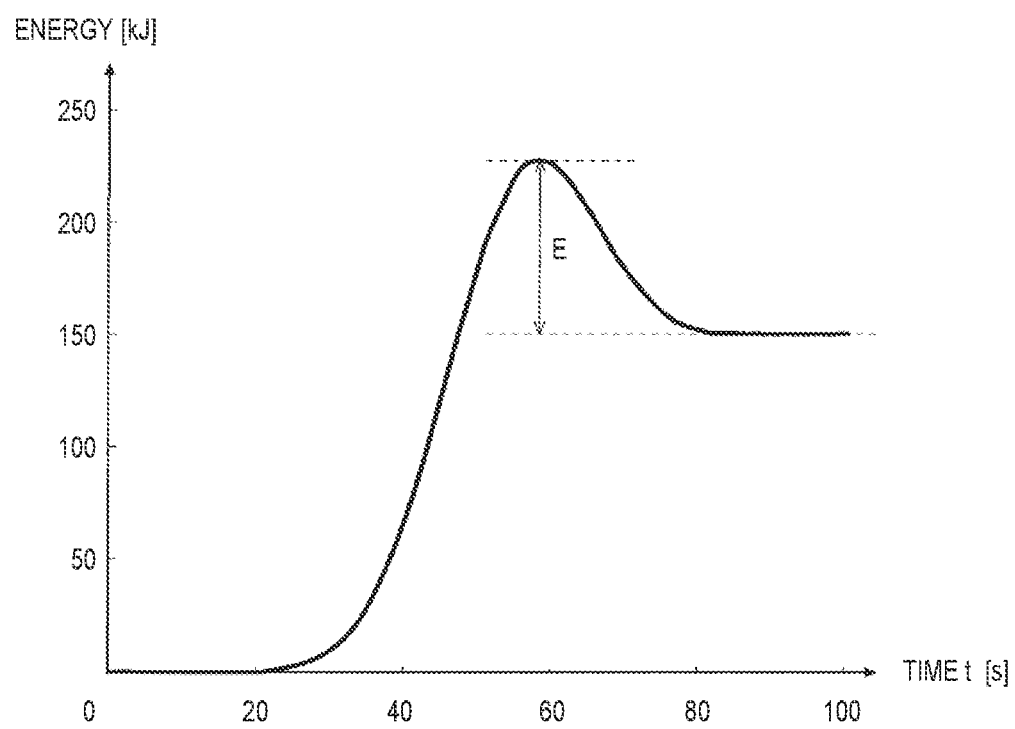
FIG. 12 is a diagram illustrating a graph of an example of an integral value of the required amount of power according to an embodiment of the present disclosure.

FIG. 12 illustrates a graph of the integral value I(t) of the required amount of power illustrated in FIG. 11 from time 0 (zero) to time t. In the graph, the horizontal axis represents time t[s] and the vertical axis represents energy [kJ]. I(t) is expressed by the following equation 10:

$$I(t)=\int_0^t P(T)dT \quad \text{(eq. 10)}$$

In FIG. 12, a difference between an energy value at the peak and an energy value when the graph becomes flat after the peak is equal to the estimated value E of the predicted amount of regenerative energy to be recovered.

By extracting one or more periods in which the required amount of power is negative over the entire period of the speed profile and obtaining an integral value of the magnitude of the required amount of power for each period, it is possible to estimate, at the start of the trip, one or more periods in which regenerative energy is recoverable and the predicted recovery amount for each period.

The weight m of the vehicle, and the coefficients a, b, c are all constants basically determined by characteristics of the vehicle, and when proper values are set for the coefficients, appropriate estimation accuracy can be obtained. However, when one or more fluctuation factors that can influence the required amount of power can be acquired, it is possible to improving estimation accuracy further by correcting at least one of the weight m, and the coefficients a, b, c, based on the acquired fluctuation factors as below.

For example, when the estimation unit 13 can acquire the load weight of an occupant, luggage, or the like, by an input from a weight sensor or the like included in the vehicle, or the user, the estimation unit 13 may correct the weight m of the vehicle to a weight obtained by adding the load weight to the weight of the vehicle itself.

Further, the estimation unit 13 may correct the coefficients a, b, c using these fluctuation factors when the fluctuation factors of the traveling resistance, such as the type of the road surface, the slope of the road surface, and the weather, can be acquired.

For example, when a traveling route is set for this trip, it is possible to specify the type and the slope of the road surface, and correct the coefficients using this information. Information on the type and the slope of the road surface may be stored in advance in the storage unit 70 in association with map information, or may be acquired by the communication unit 80 from an external server or the like. Further, it is possible to correct the coefficients using information on the weather. The information on the weather may be acquired by various sensors included in the vehicle, or may be acquired by the communication unit 80 from an external server or the like.

For example, when the road surface is relatively slippery like a gravel road, the traveling resistance is corrected to be larger than when the road surface is relatively not slippery like a paved road.

Further, when the information on the slope of the road surface indicates that the road is an uphill road, the traveling resistance is corrected to be larger than when it is a flat road, and when the information on the slope of the road surface indicates that the road is a downhill road, the traveling resistance is corrected to be smaller than when it is a flat road. In the equation 8, the influence of the increase/decrease in potential energy of the vehicle on the required amount of power P(t) is reflected by the correction of the traveling resistance based on the slope of the road surface.

Further, when it rains or snows, the traveling resistance is corrected to be larger than when it is sunny. Further, since the proceeding direction of the vehicle can be estimated when the traveling route is set for this trip, the traveling resistance may be corrected based on the air volume and the wind direction, as the weather. For example, in a case where the air volume is not zero, the traveling resistance is corrected to be larger when it is head wind and smaller when it is tail wind than when the air volume is zero, depending on the air volume and the wind direction.

When such traveling resistance is corrected, specifically, the values of the coefficients a, b, c are changed. In this case, the coefficients a, b, c are changed depending on the position of the vehicle, but it is possible to lead the coefficients a, b, c, respectively to a function of time t according to the approximation expression of the equation 6. In consideration of speed-dependent characteristics of the influence of the fluctuation factor on the traveling resistance, it is possible to properly determine to correct which of the coefficients a, b, c to what extent.

Further, instead of, or in addition to, the correction as above, the estimation unit 13 may correct the value of the estimated value E according to the above-described fluctuation factors. In other words, the correction coefficient α (for example, 0≤α≤1) may be determined for each period such that the value of the estimated value E after the correction becomes smaller as the load weight becomes larger or the traveling resistance becomes larger due to the fluctuation factors, and the correction may be executed according to the following equation 11.

$$E=\alpha\cdot\int_{t1}^{t2}|P(t)|dt \quad \text{(eq. 11)}$$

The correction coefficient α may reflect the efficiency of regenerative braking such that the estimated value E after the correction becomes larger as the efficiency of regenerative braking is higher. The efficiency of regenerative braking can be derived based on, for example, the rotation speed of the electric motor 31, which is assumed according to the speed v(t), and an efficiency map corresponding to the rotation speed.

Alternatively, instead of giving an independent correction coefficient α for each period, the estimated value E may be corrected by deriving a coefficient profile that expresses the balance of electric energy over the entire trip which is captured in perspective and using the coefficient profile at the time of predicting an amount of regenerative energy, which is energy recoverable by regenerative braking. Here, with further reference to FIGS. 13 to 17, an example will be described in which the derivation unit 12 of the traveling control apparatus 10 derives a coefficient profile which is a coefficient at each time according to fuel consumption characteristics of the internal combustion engine.

Figure 9:
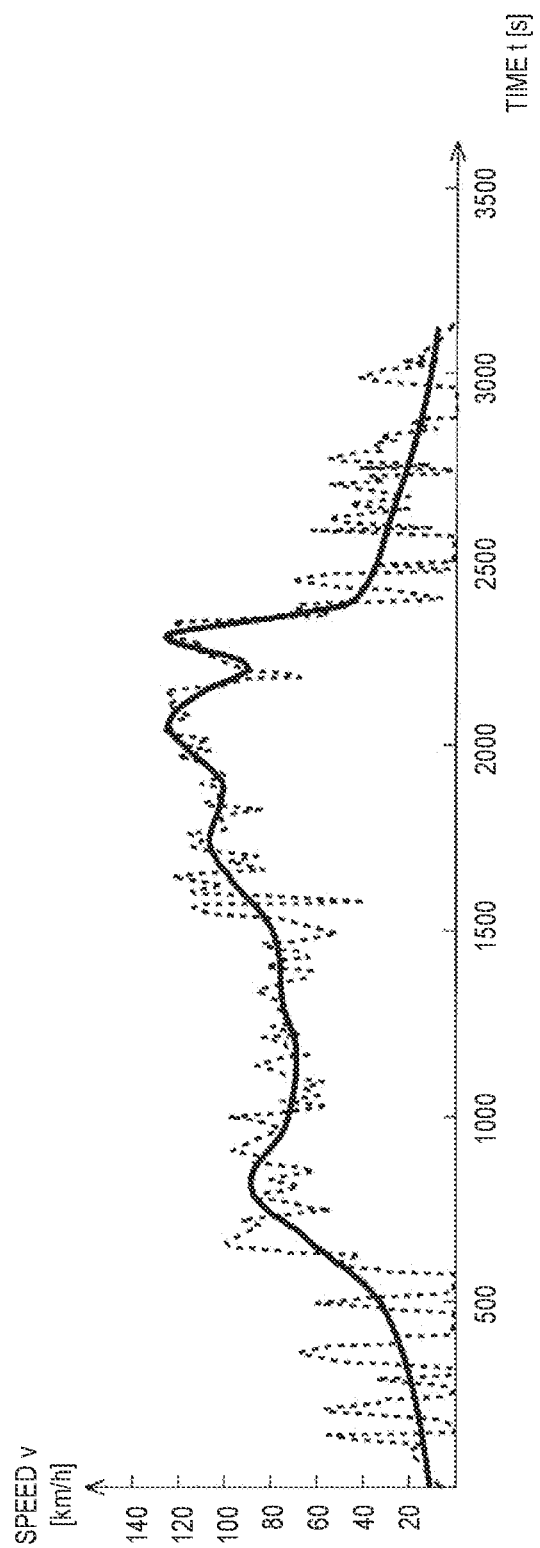
FIG. 9 is a diagram illustrating a graph in which the speed profile of FIG. 7 according to an embodiment of the present disclosure is approximated by the Gaussian function.
Figure 13:
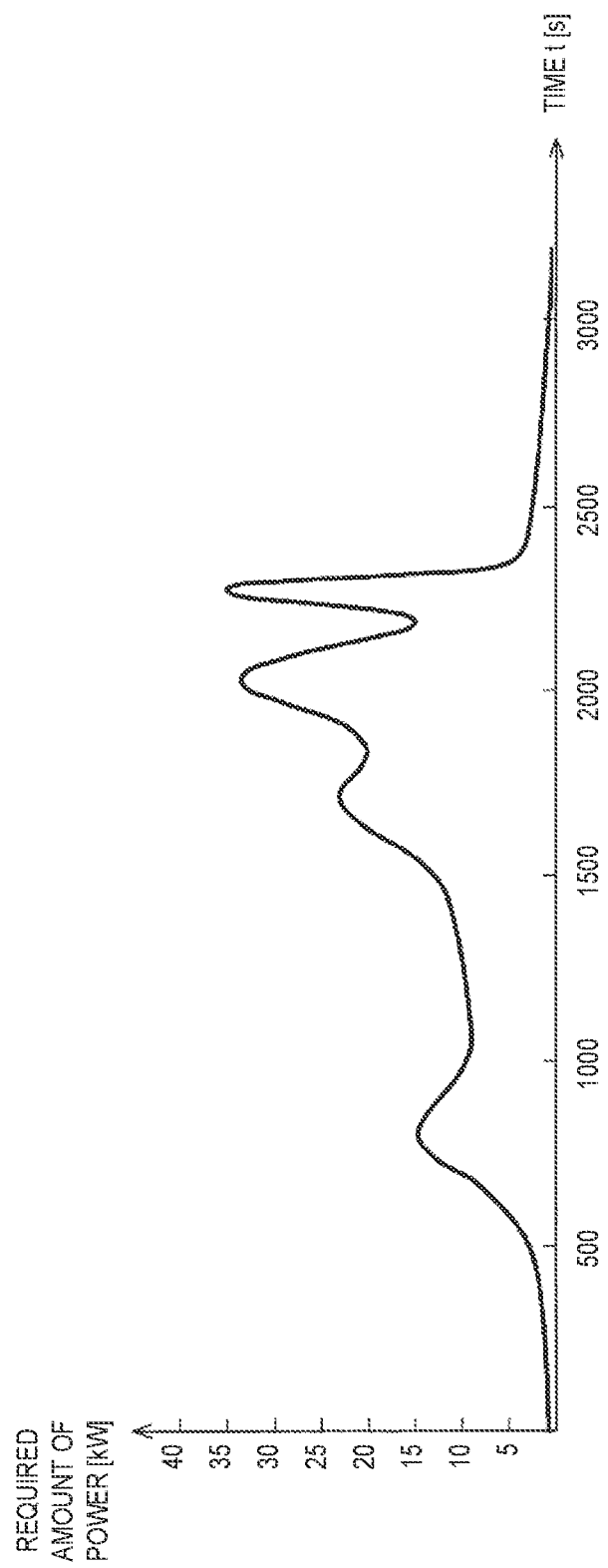
FIG. 13 is another diagram illustrating the graph of the example of the required amount of power according to an embodiment of the present disclosure.
Figure 14:
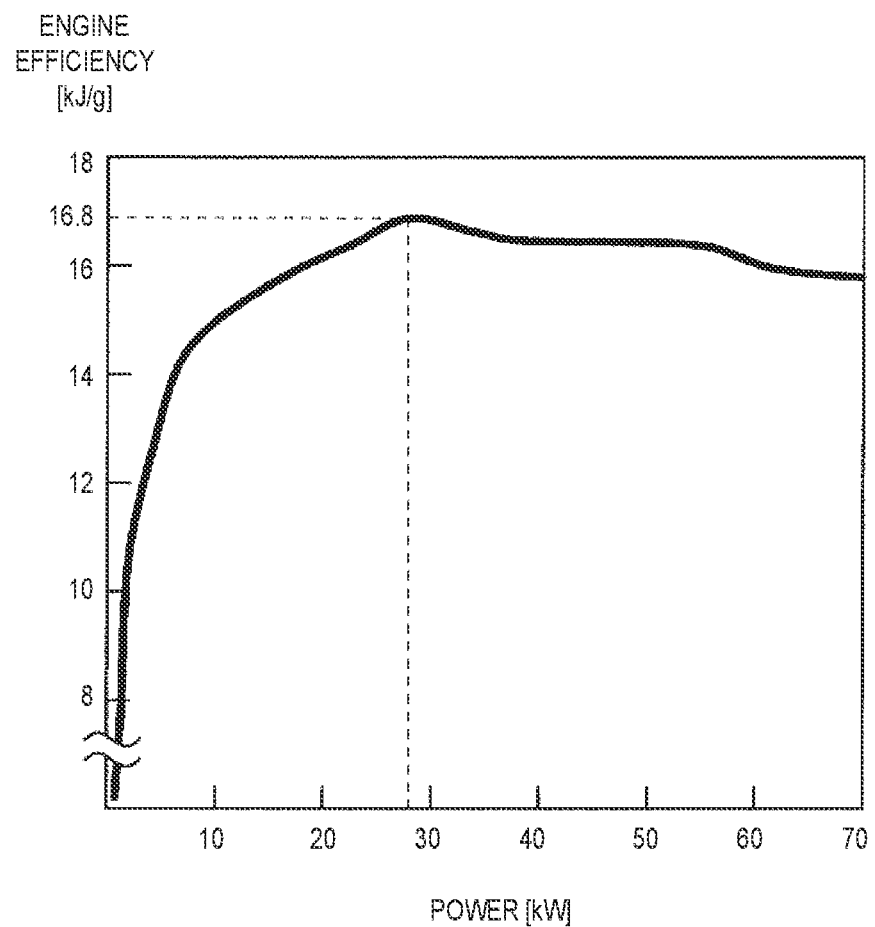
FIG. 14 is a diagram illustrating a graph of an example of an efficiency characteristic of an internal combustion engine according to an embodiment of the present disclosure.

FIG. 13 is an example of a profile of the required amount of power P(t), obtained from the approximation function of the speed profile illustrated in FIG. 9 in consideration of the fluctuation factors, such as the traveling resistance or the slope. FIG. 14 is a diagram illustrating efficiency characteristics of the internal combustion engine.

Figure 15:
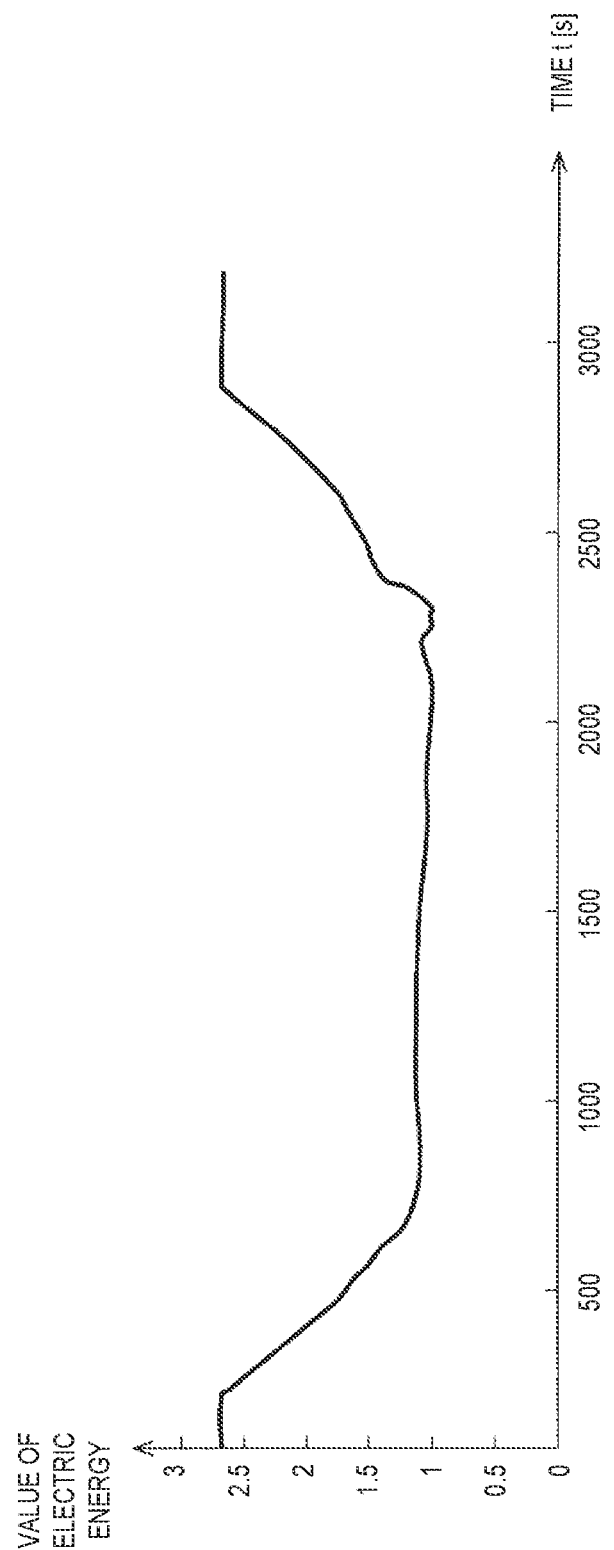
FIG. 15 is a diagram illustrating an example of a correction coefficient profile according to an embodiment of the present disclosure.

In this example, the derivation unit 12 divides the profile (see FIG. 13) of the required amount of power P(t), obtained based on the speed profile, by 16.8 [kJ/g], which is the value of the optimum driving point (the peak) in the efficiency characteristics of the internal combustion engine illustrated in FIG. 14. This division quantifies the efficiency of utilization of the internal combustion engine. Then, as illustrated in FIG. 15, by obtaining a reciprocal of the result of this division, the derivation unit 12 obtains a coefficient profile such that a value thereof is smaller in a section in which the utilization of the internal combustion engine is more efficient (the high-speed traveling section in the example of FIG. 9).

Figure 16:
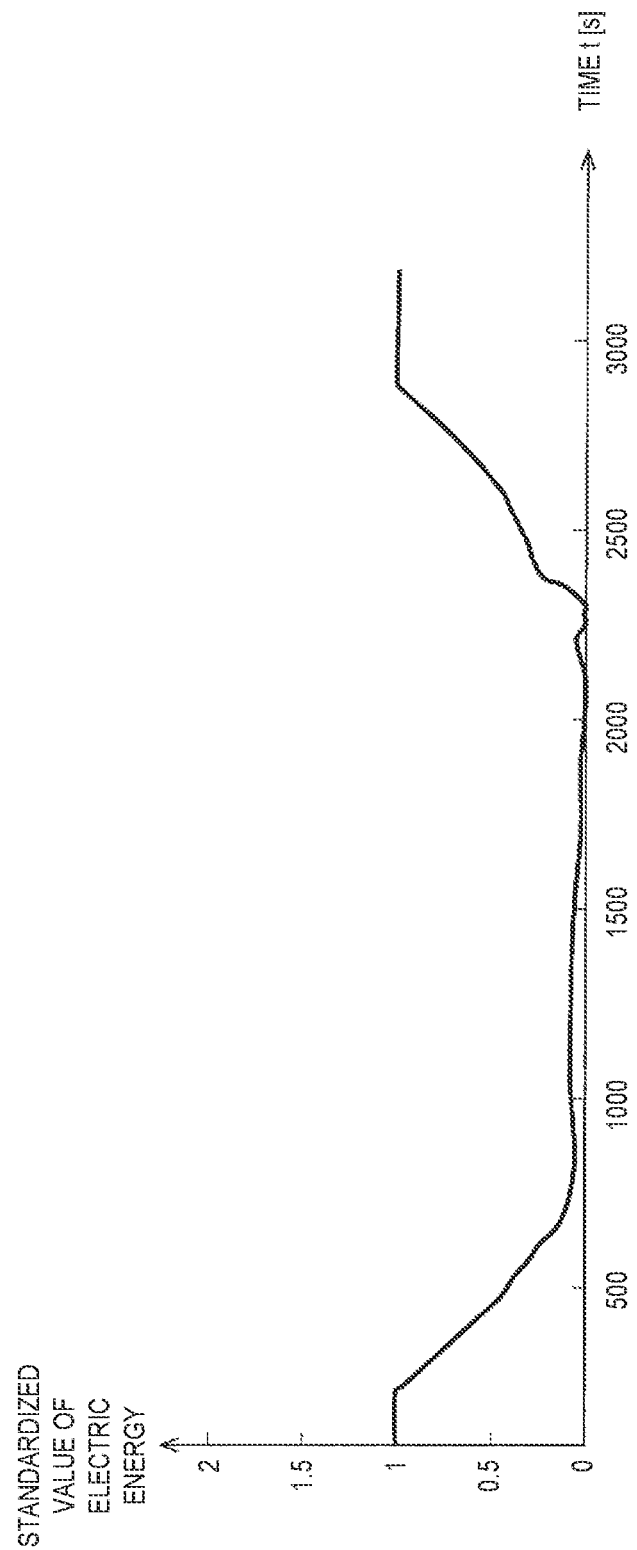
FIG. 16 is a diagram illustrating an example of the correction coefficient profile after standardization according to an embodiment of the present disclosure.
Figure 17:
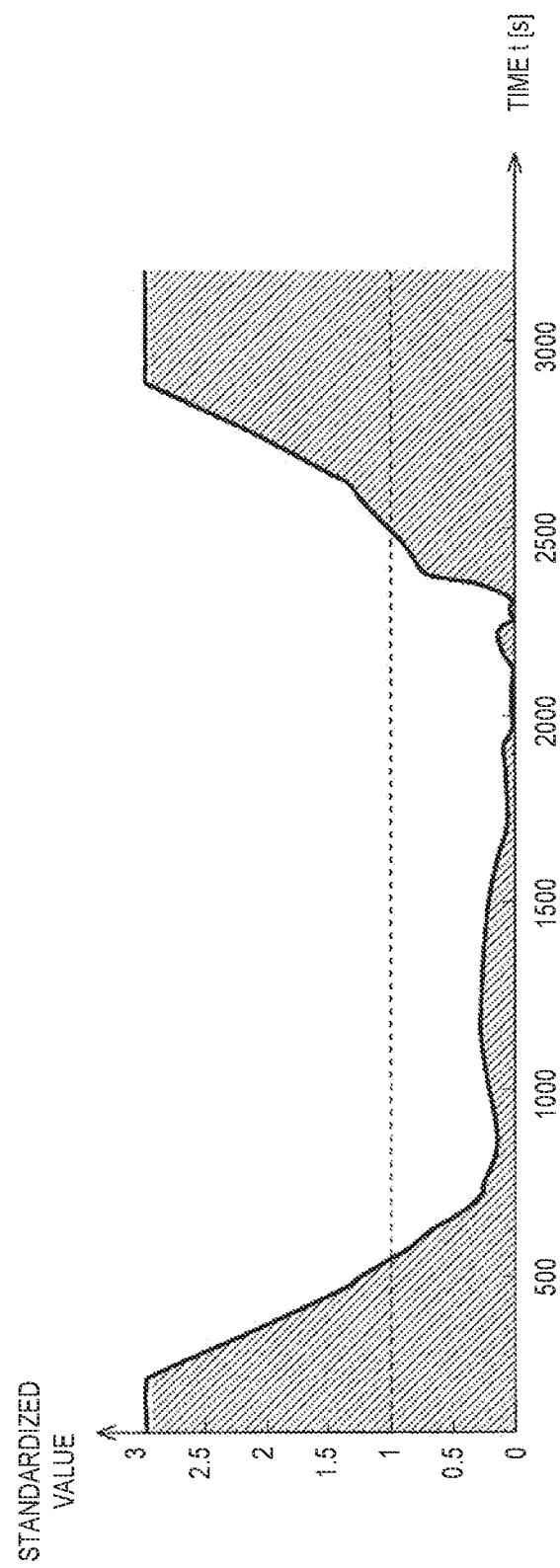
FIG. 17 is a diagram illustrating an example of an electricity utility value profile according to an embodiment of the present disclosure.

Further, as illustrated in FIG. 16, the derivation unit 12 standardizes the coefficient profile such that the minimum value of the obtained coefficient is zero and the maximum value is one. Finally, by dividing the entire coefficient profile by the time-integral value of the standardized coefficient from the start of the trip to the end of the trip, the derivation unit 12 adjusts the value of each coefficient such that the average value of the standardized coefficient profiles is one for the entire trip, so as not to cause an excess or deficiency in the balance of electric energy in the trip. FIG. 17 illustrates a coefficient profile (an electricity utility value profile) in which the value of the coefficient is adjusted. In FIG. 17, the size of a shaded part is adjusted to be one throughout the entire trip.

As such, it is possible to obtain more appropriate fuel consumption while restricting changes in a state of charge (SOC) of the battery 41 that occur between the departure and the arrival at a destination by deriving the coefficient profile (the electricity utility value profile), which is a coefficient at each time, from the speed profile, the traveling resistance coefficient of the vehicle, and, desirably, the slope profile of the road and the efficiency of the fuel and the generated energy with respect to output power of the internal combustion engine and by multiplying it by the estimated value E of the predicted amount of regenerative energy, which is energy recoverable by regenerative braking of the electric motor 31.

The specific numerical calculation method for the above processing is not limited, and a well-known calculation algorithm can be properly used. In the present embodiment, since the characteristics of the speed profile can be expressed with relatively few parameters by approximation using the Gaussian function, the calculation amount can be reduced. Further, when function values of the Gaussian functions or their derivatives for a plurality of numerical values, or definite integral values of the Gaussian function in a plurality of numerical ranges are prepared in advance as a numerical table, properly referred to, and used for calculation, the calculation amount can be further reduced.

(Step S104)

The determination unit 14 determines whether a condition for traveling using the electric motor 31 is satisfied. In the present embodiment, for example, the determination unit 14 executes a control of switching traveling modes between an electric motor mode, in which only the electric motor 31 is used, and an internal combustion engine mode, in which only the internal combustion engine 21 is used, from among the electric motor 31 and the internal combustion engine 21.

Here, the determination unit 14 appropriately acquires various types of information from various sensors included in the vehicle, the driving assistance ECU 60, the manager ECU 50, and the like, and makes a determination as below as an example.

(1) When an intention of decelerating the vehicle is established, the determination unit 14 determines whether the following conditions (1-1) to (1-3) are satisfied. When the intention of decelerating the vehicle is satisfied, for example, at least one of the fact that the user has executed an operation of the brake pedal and the fact that the user has released an operation of the accelerator pedal is established during the traveling of the vehicle, or an instruction indicating deceleration or stop has been given from the driving assistance ECU 60 or autonomous driving ECU 65 during an operation of a driving assistance function or an autonomous driving function of these ECUs.

(1-1) The speed of the vehicle is equal to or higher than a first speed threshold value.

Currently, when an actual speed of the vehicle is relatively low, a sufficient rotation speed of the electric motor 31 cannot be obtained during regenerative braking, and thus efficient recovery of regenerative energy cannot be expected. Therefore, the determination unit 14 determines whether the speed of the vehicle is equal to or higher than the first speed threshold value, which is defined as a speed at which a certain degree of regeneration efficiency can be expected.

(1-2) The required amount of power is equal to or lower than a first power threshold value.

When a current required amount of power is relatively large, the electric motor 31 may not be able to output the required amount of power even when the internal combustion engine 21 can output the required amount of power, because the maximum output of the electric motor 31 is generally smaller than that of the internal combustion engine 21. Therefore, the determination unit 14 determines whether the required amount of power is equal to or lower than the first power threshold value, which is defined as power that can be output by the electric motor 31.

(1-3) The SOC of the battery 41 is equal to or lower than a first SOC threshold value.

When a current SOC of the battery 41 is high, a power amount that can be further charged is small and all of the regenerative energy may not be stored. Therefore, the determination unit 14 determines whether the SOC of the battery 41 is equal to or lower than the first SOC threshold value, which is defined as a SOC at which a sufficient power amount can be charged. For the determination, instead of the SOC, the storage amount may be used.

When all the determination results of (1-1) to (1-3) are positive and the electric motor traveling condition is satisfied, the process proceeds to step S105, and otherwise, the process proceeds to step S107.

(Step S105)

(2) For cases other than the above-described case (1), that is, for cases other than the case where the intention of decelerating the vehicle is established, the determination unit 14 determines whether the following conditions (2-1) to (2-4) are satisfied.

(2-1) The speed of the vehicle is lower than a second speed threshold value.

Currently, when the actual speed of the vehicle is relatively high, the internal combustion engine 21 is generally more efficient than the electric motor 31. Therefore, the determination unit 14 determines whether the speed of the vehicle is lower than the second speed threshold value, which is defined as a speed at which the electric motor 31 can be expected to be more efficient. The second speed threshold value is higher than the first speed threshold value.

(2-2) The required amount of power is equal to or lower than the first power threshold value.

For the same reason as in the above-described (1-2), the determination unit 14 determines whether the required amount of power is equal to or lower than the first power threshold value, which is defined as power that can be output by the electric motor 31.

(2-3) A sum of energy for the electric motor currently stored in the vehicle and the predicted amount of regenerative energy in the next period in which regenerative energy is recoverable is equal to or higher than the first energy threshold value. In a case where a total amount of stored power amount, which is currently stored in the battery 41 of the vehicle and can be supplied to the electric motor 31, and the predicted amount of power, which can be recovered in the next period in which regenerative energy is recoverable, is relatively small, when the vehicle travels using the electric motor 31, the stored power amount of the battery 41 decreases and each function of the vehicle may be interfered with. Therefore, the determination unit 14 determines whether the total amount is equal to or higher than the first energy threshold value, which is defined as a sufficient amount.

(2-4) Currently, the vehicle is traveling using the internal combustion engine 21, and a time period equal to or higher than the first time threshold value has elapsed since the operation of the internal combustion engine 21 was started.

When the operation of the internal combustion engine 21 is stopped immediately after the start of the operation, the user may feel that the internal combustion engine 21 is malfunctioning or the vehicle behavior is unstable, which may cause a sense of discomfort or instability. Therefore, the determination unit 14 determines whether a time period equal to or higher than the first time threshold value, which is determined as a sufficient elapsed time at which a sense of discomfort or the like is not generated even when the operation of the internal combustion engine 21 is stopped after the start of the operation of the internal combustion engine 21.

When all the determination results of (2-1) to (2-4) are positive and the electric motor traveling condition is satisfied, the process proceeds to step S105, and otherwise, the process proceeds to step S106.

(Step S106)

The determination unit 14 determines the traveling mode as the electric motor mode. In the present embodiment, the determination unit 14 notifies the traveling control ECU 90 that the traveling mode is set to the electric motor mode. The traveling control ECU 90 causes the electric motor ECU 30 to control traveling by the electric motor 31.

In the electric motor mode, regenerative braking is executed and kinetic energy of the vehicle is recovered as power. When the user depresses the brake pedal strongly, or the driving assistance ECU 60 gives a high-priority rapid deceleration instruction to avoid a collision or the like, and thus, deceleration equal to or higher than a certain level is required, the manager ECU 50 and the brake ECU 110 execute a control of causing the brake device 111 to generate the braking force so as to generate sufficient braking force.

(Step S107)

The determination unit 14 determines the traveling mode as the internal combustion engine mode. In the present embodiment, the determination unit 14 notifies the traveling control ECU 90 that the traveling mode is set to the internal combustion engine mode. The traveling control ECU 90 causes the internal combustion engine ECU 20 to control traveling by the internal combustion engine 21.

(Step S108)

The creation unit 11 determines whether a condition for updating the predicted amount of regenerative energy is satisfied. The condition for updating is, for example, that the degree of matching between the changes in the actual speed over time in the traveling up to the present and the speed profile created in step S101 is lower than an allowable value properly determined in advance. The degree of matching can be derived by using a well-known method as appropriate. For example, the degree of matching can be derived based on the integral value of the absolute value of the difference between the speed value of the speed profile and the actual speed value over a certain period of time in the past. When the degree of matching is lower than the allowable value, it is considered that the accuracy of the period in which regenerative energy is recoverable, the predicted amount, or the like is also low. When the condition for updating is satisfied, the process proceeds to step S109, and otherwise, the process proceeds to step S104.

(Step S109)

The estimation unit 13 updates the period in which regenerative energy is recoverable or the predicted amount by re-estimating them. The updating method is not particularly limited, but for example, the estimation unit 13 can execute the updating by executing deformation through compression or expansion of a time scale of the speed profile such that the degree of matching with the changes in the actual speed over time in the traveling up to the present becomes high, and by executing the same processing as in steps S102 and S103 based on the speed profile after the deformation.

Alternatively, the creation unit 11 may execute the same processing as in step S101, select a traveling history other than the traveling history used to create the current speed profile, and create a new speed profile based on the selected traveling history, and then the estimation unit 13 may execute the updating by executing the same processing as in steps S102 and S103 based on the newly created speed profile. For example, when the vehicle is stopped, the creation unit 11 considers that a new trip is started from that place at that time and selects the traveling history in the same manner as in step S101.

Further, since the values of the above-described fluctuation factors may have changed during such updating, correction may be executed using the latest values. By executing such updating, it is possible to improve the estimation accuracy of the period in which regenerative energy is recoverable or of the predicted amount. After the processing of this step, the process proceeds to step S104.

In the above processing, two traveling modes, that is, the electric motor mode, in which the vehicle travels using only the electric motor 31, and the internal combustion engine mode, in which the vehicle travels using only the internal combustion engine 21, are set. As in the above condition (2-3), when the recovery amount of regenerative energy can be predicted to be large, it is possible to improve the fuel efficiency by increasing the number of opportunities to travel using the electric motor 31, as compared with a case where the recovery amount of regenerative energy is predicted to be small. Focusing on this, it is possible to utilize the predicted recovery amount of regenerative energy when improving fuel efficiency in a switching control between any two traveling modes from among three traveling modes of the electric motor mode, the internal combustion engine mode, and a hybrid mode in which the electric motor 31 and the internal combustion engine 21 are used for traveling together, or a switching control between the three traveling modes.

For example, when the recovery amount of regenerative energy can be predicted to be large, the number of opportunities to transit from the internal combustion engine mode to the hybrid mode is increased or the number of opportunities to transit from the hybrid mode to the electric motor mode is increased, as compared to a case where the recovery amount of regenerative energy is predicted to be small.

Advantageous Effect

The traveling control apparatus 10 according to the present embodiment can quantitatively predict the recovery amount of regenerative energy at an early stage using the speed profile obtained by predicting the speed of the vehicle and a coefficient profile that expresses the balance of electric energy over the entire trip which is captured in perspective. By utilizing this predicted result, it is possible to appropriately control traveling. In other words, when the recovery amount of regenerative energy can be predicted to be large, it is possible to improve the fuel efficiency by increasing the number of opportunities of traveling using the electric motor 31, as compared with the case where the recovery amount of regenerative energy is predicted to be small.

The traveling control apparatus 10 can reduce the number of parameters used for calculating the predicted recovery amount of regenerative energy by approximating the speed profile by the Gaussian function, and reduce the calculation amount by referring to the numerical table on the Gaussian function, prepared in advance.

The traveling control apparatus 10 can obtain an efficient and accurate approximation function by properly determining, based on the traveling state and the like in the target trip, the number N of Gaussian functions by which the speed profile is approximated.

Since the traveling control apparatus 10 can create the speed profile based on the traveling history of the user or of a person other than the user, the traveling control apparatus 10 can estimate the predicted recovery amount of regenerative energy even when the user has not set the traveling route. Further, when the user has set the traveling route, the traveling control apparatus 10 can create the speed profile using the traveling route and improve the estimation accuracy.

Since the traveling control apparatus 10 corrects the predicted amount based on the fluctuation factor considered to influence the recovery amount of regenerative energy, the traveling control apparatus 10 can reflect the fluctuation factor and improve the estimation accuracy. Further, by deriving the coefficient profile using the efficiency characteristics of the internal combustion engine, the traveling control apparatus 10 can estimate the predicted amount of regenerative energy in consideration of the efficiency at the time of traveling of the vehicle by driving the internal combustion engine. As such, it is possible to achieve more appropriate fuel consumption while restricting the changes in the SOC of the battery 41 that occur between the departure of the vehicle and the arrival at the destination.

When the degree of matching between the speed profile and the changes in the actual speed of the vehicle is low, the traveling control apparatus 10 re-estimates the predicted recovery amount, such that the estimation accuracy can be improved.

At the time of determining the traveling mode, since the traveling control apparatus 10 determines which of the internal combustion engine 21 and the electric motor 31 is appropriate in consideration of storage possibility of regenerative energy, operation efficiency, and a possibility of implementing the required amount of power based on the storage rate of the battery 41, the speed of the vehicle, the required amount of power, and the like in addition to the predicted recovery amount of regenerative energy, it is possible to increase the reliability and stability of the vehicle control.

Although one embodiment of the present disclosure has been described above, the present disclosure can be properly modified and implemented. The present disclosure can be regarded as, for example, the traveling control method executed by the traveling control apparatus that includes a processor and a memory, a traveling control program, a computer-readable non-transitory storage medium storing the traveling control program, and a vehicle including the traveling control apparatus in addition to the traveling control apparatus.

The present disclosure is useful for a traveling control apparatus mounted on a vehicle or the like.

What is claimed is:

1. A traveling control apparatus, the traveling control apparatus being configured to be mounted on a vehicle that includes an electric motor and an internal combustion engine as power sources, the traveling control apparatus comprising:
an electronic control unit configured to:
create a speed profile obtained by predicting speed of the vehicle at each time;
create an approximated speed profile which is created by approximating the speed profile with a predetermined approximation model;
create a power profile represented by a power which is required to implement the approximated speed profile, based on the approximated speed profile;
estimate a predicted amount of regenerative energy based on the power profile; and
switch or maintain the power source for traveling based on the predicted amount of regenerative energy.

2. The traveling control apparatus according to claim 1, wherein the electronic control unit is configured to create the speed profile based on one or both of a traveling history of a user and a traveling history of a person other than the user.

3. The traveling control apparatus according to claim 1, wherein a model that approximates changes in the speed of the vehicle over time by a sum of Gaussian functions having different peak positions, is used as the predetermined approximation model, the changes in the speed of the vehicle over time being represented by the speed profile.

4. The traveling control apparatus according to claim 3, wherein the number of the Gaussian functions that approximate the speed profile is set as the number of poles at which an average speed for each of a plurality of sections obtained by dividing the speed profile at equal intervals changes from an increase to a decrease.

5. The traveling control apparatus according to claim 4, wherein the electronic control unit is configured to calculate a parameter of the Gaussian functions using at least any two of speed, mileage, and a required traveling time of the vehicle.

6. The traveling control apparatus according to claim 3, wherein the electronic control unit is configured to:
derive power represented by a sum of power that contributes to a change in kinetic energy of the vehicle and power that is dissipated by traveling resistance;
set one or more periods in which the power is negative as a period in which regenerative energy is recoverable; and
set a time-integral value of a magnitude of the power in the period as an estimated value of the predicted amount of regenerative energy in the period.

7. The traveling control apparatus according to claim 6, wherein the electronic control unit is configured to estimate the predicted amount of regenerative energy further based on one or more fluctuation factors.

8. The traveling control apparatus according to claim 7, wherein the fluctuation factor is at least one of a kind of road surface, a slope of the road surface, a load weight of the vehicle, and weather.

9. The traveling control apparatus according to claim 7, wherein the electronic control unit is configured to correct power based on the fluctuation factor.

10. The traveling control apparatus according to claim 7, wherein the electronic control unit is configured to correct the time-integral value based on the fluctuation factor.

11. The traveling control apparatus according to claim 6, wherein the electronic control unit is configured to, when a condition including a situation where a sum of energy for the electric motor currently stored in the vehicle and the predicted amount of regenerative energy in a next period is equal to or higher than a threshold value is satisfied, determine to travel using the electric motor.

12. The traveling control apparatus according to claim 1, wherein the electronic control unit is further configured to:
after the switching or maintaining of the power source, assess whether a predicted amount update condition relating to the speed profile is satisfied; and
when the predicted amount update condition is satisfied, update the predicted amount of regenerative energy.

13. A traveling control method, the traveling control method being executed by an electronic control unit mounted on a vehicle that includes an electric motor and an internal combustion engine as power sources, the traveling control method comprising:
creating, by the electronic control unit, a speed profile obtained by predicting speed of the vehicle at each time;
creating, by the electronic control unit, an approximated speed profile which is created by approximating the speed profile with a predetermined approximation model;
creating, by the electronic control unit, a power profile represented by a power which is required to implement the approximated speed profile, based on the approximated speed profile;
estimating, by the electronic control unit, a predicted amount of regenerative energy based on the power profile; and
switching or maintaining, by the electronic control unit, the power source for traveling based on the predicted amount of regenerative energy.

14. A non-transitory storage medium storing a command executable on an electronic control unit of a traveling control apparatus mounted on a vehicle that includes an electric motor and an internal combustion engine as power sources, the command causing the electronic control unit to execute the following functions:
creating a speed profile obtained by predicting speed of the vehicle at each time;
creating an approximated speed profile which is created by approximating the speed profile with a predetermined approximation model;
creating a power profile represented by a power which is required to implement the approximated speed profile, based on the approximated speed profile;
estimating a predicted amount of regenerative energy based on the power profile; and
switching or maintain the power source for traveling based on the predicted amount of regenerative energy.

* * * * *